United States Patent [19]

Kniege et al.

[11] Patent Number: 4,487,906

[45] Date of Patent: Dec. 11, 1984

[54] THERMOSETTING ORGANOPOLYSILOXANE COMPOSITIONS

[75] Inventors: Wilfried Kniege, Bergisch Gladbach; Werner Michel, Cologne; Jürgen Ackermann, Bergisch Gladbach; Karl-Heinz Rudolph, Cologne, all of Fed. Rep. of Germany

[73] Assignee: Bayer Aktiengesellschaft, Leverkusen, Fed. Rep. of Germany

[21] Appl. No.: 513,477

[22] Filed: Jul. 13, 1983

[30] Foreign Application Priority Data

Jul. 20, 1982 [DE] Fed. Rep. of Germany ....... 3227018

[51] Int. Cl.³ .............................................. C08G 77/06
[52] U.S. Cl. ........................................ 528/15; 528/31; 528/32; 528/24
[58] Field of Search ................... 528/24, 31, 32, 15

[56] References Cited

U.S. PATENT DOCUMENTS

| 3,188,299 | 6/1965 | Chalk | 528/15 |
|---|---|---|---|
| 3,453,233 | 7/1969 | Flatt | 528/15 |
| 3,723,567 | 3/1973 | Mink et al. | 528/15 |
| 3,882,083 | 5/1975 | Berger et al. | 528/15 |
| 3,992,355 | 11/1976 | Itoh et al. | 528/15 |
| 4,061,609 | 12/1977 | Bobear | 528/32 |
| 4,329,275 | 5/1982 | Hatanaka et al. | 528/24 |
| 4,339,564 | 7/1982 | Okamura | 528/31 |
| 4,340,710 | 7/1982 | Brown, Jr. | 528/15 |
| 4,382,057 | 5/1983 | Tolentino | 528/15 |

FOREIGN PATENT DOCUMENTS 0037226 10/1981 European Pat. Off. .

*Primary Examiner*—Melvyn I. Marquis
*Attorney, Agent, or Firm*—Sprung, Horn, Kramer & Woods

[57] ABSTRACT

In a polysiloxane rubber composition which vulcanizes under heat to form an elastomer and comprising
(a) a polyorganosiloxane containing unsaturated radicals,
(b) a compound containing Si-H groups,
(c) a platinum-containing addition catalyst, and
(d) an organic peroxide, the improvement which comprises
(e) a compound capable of forming a complex ligand with platinum, whereby the storability of the composition is improved.

7 Claims, No Drawings

THERMOSETTING ORGANOPOLYSILOXANE COMPOSITIONS

The present invention relates to thermosetting organopolysiloxane compositions containing a novel inhibitor system.

Organopolysiloxane compositions which can be hardened to give elastomers are already known. These are polymers and polymer mixtures which are predominantly on a polydimethylsiloxane basis and have a viscosity range extending from a few mPas to several million mPas. Both free radical reactions and condensation and addition reactions are used for crosslinking these compositions. Examples are heating with peroxides, the combination of silanol groups with silicic acid esters, alcohols being split off, and the addition, catalyzed by noble metals, of silicon hydride compounds onto alkenylsiloxanes. Fillers which have reinforcing action and/or reduce the cost are usually added to these compositions.

With respect to the incipient vulcanization properties, organopolysiloxane compositions which vulcanize with peroxide are the optimum prior art, while crosslinking by an addition reaction conceals a number of difficulties which are described in more detail below.

The invention permits the preparation of compositions which crosslink by addition reaction and can be hardened to give elastomers, and which have the following valuable combination of properties:
(a) Good storability at room temperature
(b) Good protection against premature incipient vulcanization (scorch) at elevated temperatures
(c) Rapid complete vulcanization at the crosslinking temperature.

Suitable noble metal catalysts are, above all, compounds of platinum, ruthenium, rhodium, palladium and iridium. The metals themselves are also active, as long as they are present in the finely divided form. In addition, certain complex compounds of iron, cobalt and nickel have also been described as addition catalysts. However, it has not hitherto been possible to demonstrate convincingly their suitability as the crosslinking catalyst for elastomers. Lists of compounds which are effective as the catalyst can be found in the following patent specifications: DE-AS [German Published Specification] No. 2,631,300 and U.S. Pat. Specification 3,453,234.

In the past, many proposals have been made with the aim of improving the storage stability of silicone compositions which are already provided with crosslinking agents and can be crosslinked by an addition reaction to give elastomers. These proposals amount to adding to the reactive compositions chemical compounds which inhibit the activity of the noble metal compounds added as the catalyst. These substances, which are frequently called the inhibitor, are chosen such that, at temperatures above room temperature, their inhibiting action is gradually overcome by the catalytic activity of the noble metal. If the temperature chosen is sufficiently high, a crosslinked elastomer can thus be obtained from the liquid to plastic crude composition.

Stabilizers for this purpose are amines or amide compounds, compare, for example, U.S. Pat. Specification 3,188,299; sulphides or sulphoxide compounds, compare, for example, U.S. Pat. Specification 3,453,234; phosphine compounds, compare, for example, U.S. Pat. Specification 3,188,300; ionic substances containing heavy metals, compare, for example, U.S. Pat. Specification 3,532,649, acetylenic compounds, compare, for example, U.S. Pat. Specification 3,445,420; and ethylenically unsaturated cyanurates and isocyanurates, for example DE-OS [German Published Specification] No. 2,454,257, and mellitates, citrates and phosphates. However, these organopolysiloxane compositions containing stabilizers spread an unpleasant odor contaminate the working atmosphere and intensify tracking currents in electronic circuit elements onto which they have been applied.

The vast majority of known inhibitors are quite heat-stable compounds, and are stable at the temperatures used for crosslinking. In principle, this entails three disadvantages which conflict with the general desire for crosslinking which is as efficient as possible:
(a) The inhibitors remain incorporated in the hardened product and can lead to an impairment of desirable properties—such as, for example, optical purity, odor, physiological acceptability.
(b) If subsequent removal of such undesirable concomitant substances is possible at all, it requires, in certain circumstances, tedious after-treatments - for example storage in hot air or washing processes - from which the profitability of the preparation processes can suffer greatly.
(c) The inhibitors retain their effectiveness even at the vulcanization temperature, and reduce the crosslinking efficiency.

The peroxide crosslinking carried out in practice is advantageously distinguished by the fact that no premature incipient vulcanization of the compositions containing crosslinking agents is to be feared at normal ambient temperatures. Incipient vulcanization as a rule occurs only at temperatures about 50° C. below the temperature at which the peroxide has a half-life of one minute. This fact ensures storability for many months at temperatures of about 20° C. and excellent flow of the compositions during the shaping process. Examples of this are extrusion in screw extruders or ram extruders, where temperatures of up to 80° C. can be tolerated, and also flow into the runners of metal molds, such as are usually used in the rubber industry.

These molds are preheated to the vulcanization temperature, and the elastomer mixture flowing in is expected to fill all the cavities of the mold completely, without bubbles or voids. Slow incipient vulcanization, together with rapid complete vulcanization, such as is as a rule provided by peroxides, is desirable for this purpose.

Peroxides which have proved suitable for crosslinking silicone compositions are 2,4-dichlorobenzoyl peroxide and o-chlorobenzoyl peroxide, for crosslinking under atmospheric pressure in hot air with the aid of infrared radiation. Examples which have proved suitable for crosslinking under pressure are dibenzoyl peroxide, bis-(4-chlorobenzoyl) peroxide, 1,1-bis-(t-butyl-peroxy)-3,3,5-trimethylcyclohexane, 2,2-bis-(t-butylperoxy)butane, t-butyl perbenzoate, dicumyl peroxide, bis-(t-butylperoxy-isopropyl)-benzene and di-t-butyl peroxide.

In many cases, the intense, persistent odor of the peroxide decomposition products prove to be a disadvantage of peroxide crosslinking. In the case of some peroxides, crystalline decomposition products exude onto the surface of the finished product and thereby render these unattractive, or unusable for the intended purpose. For this reason, the crosslinking is also followed by after-treatment of the finished rubber pieces in hot air, the undesirable constituents being evaporated.

Besides a high additional expenditure on energy, this extra measure also means pollution of the waste air.

Although the vast majority of silicone elastomers which vulcanize under the action of heat are crosslinked with peroxides, attempts are made to bypass the specific, abovementioned disadvantages of this process by endeavoring to adapt crosslinking by Si-H addition, which is catalyzed by noble metals, to the requirements of practice. This concerns, in particular, the following points: prevention of incipient vulcanization at room temperature, improvement of the flow properties at elevated temperatures and extension of the flow paths in the mold.

Methods are already known which permit storage at room temperature without the degree of crosslinking of the material rising to the extent that plastic flow of the crude composition is impeded.

These methods comprise adding, in addition to the noble metal catalyst, certain chemical compounds to the composition which have an inhibitor action in respect of crosslinking. Such compounds are described in the literature already mentioned.

These compounds can be classified into certain classes of substance:
(a) those which can form complexes with the noble metal, and
(b) those which are not primarily known as complexing agents.

The majority of all the inhibitors described belong in class (a).

This class includes phosphines, nitrogen-containing compounds, alkenes, alkines and thio compounds (mercaptobenzimidazole).

The second class includes substances which can interfere in the crosslinking reaction in the sense of another type of inhibition, for example hydroperoxides.

From the large number of inhibitors described, it has been possible for only a few to be accepted in practice, since many of the compounds in question are expensive and are characterized by a foul odor, low chemical stability or unavailability. Not infrequently, they lead to undesirable discoloration of the rubber and, as a result of their different chemical nature, they diminish the typical pattern of properties of silicones (heat stability, abhesiveness, physiological inertness, color stability).

The particularly effective inhibitors are difficult to handle, because of their toxicity, and relatively large amounts of less effective inhibitors, such as, for example, triallyl cyanurate or tetravinyltetramethylcyclotetrasiloxane are required, whereupon the abovementioned disadvantages must be endured.

Experience has shown that the inhibitor action is not restricted only to low temperatures, but also occurs where it is no longer desirable, that is to say at the crosslinking temperature. The observation that particularly highly active inhibitors or high dosages thereof delay complete vulcanization of the elastomers in question is to be attributed to this fact.

The vulcameter is a recognised instrument for monitoring the vulcanization properties of rubber mixtures. Such apparatuses exist in various commercially available embodiments. The crosslinking operation is monitored by a measurement of the increase in resistance to mechanical deformation.

After a certain incubation period, systems crosslinked with peroxide display a sharp rise in resistance to deformation. When shown diagrammatically with respect to time, the so-called vulcanization curve has a steplike shape. These curves are already quite close to the ideal shape.

Addition systems are distinguished by the fact that a gradual rise in the resistance to deformation is already to be observed before the main vulcanization, and the steepness of the main reaction does not always reach that of the peroxide The aim of the present invention is to provide a novel inhibitor system for a silicone rubber mixture which crosslinks by an addition reaction and consists of the customary polymers, fillers and additives.

It has been found, in fact, that extremely effective inhibition is possible if known inhibitors are conjointly used together with small amounts of peroxides.

In these systems, the peroxide and the known inhibitor act in a synergistic sense.

The present invention thus relates to a polysiloxane rubber mixture which vulcanizes under the influence of heat and consists of (a) a polyorganosiloxane containing unsaturated groups, or mixtures of such polyorganosiloxanes, (b) compounds containing Si-H groups, (c) fillers, (d) addition catalysts, and, if appropriate, other auxiliaries or processing auxiliaries; which is characterized in that these compositions additionally contain an inhibitor system consisting of an organic peroxide and one or more compounds suitable as complex ligands for platinum.

The starting materials used are:
(1) Polymers selected from linear or branched polyorganosiloxanes of the type

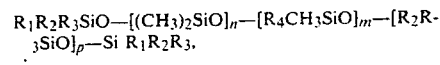

wherein
$R_1$ can be selected from the group comprising methyl, vinyl or allyl.
$R_2$ can denote methyl, phenyl, fluoroalkyl or chloromethyl.
$R_3$ can denote methyl, phenyl, alkyl with 2 to 20 C atoms or a polymer of vinyl monomers which can be formed by free radical grafting reactions,
$R_4$ can denote vinyl or allyl,
n is a number from 50 to 10,000, preferably a number from 100 to 8,000,
m is a number from 0 to 100 with the measure that the compound contains at least two vinyl groups, and
p is a number from 0 to 2,000.

(2) Reinforcing fillers, such as, for example, pyrogenically produced silicon dioxide having a specific surface area, measured by the BET method, of 50 to 400 m²/g, pyrogenically produced titanium dioxide having a specific surface area of 20 to 100 m²/g, and pyrogenically produced mixed oxides of titanium dioxide and silicic acid having surface areas of 50 to 400 m²/g.

Furthermore, high surface area fillers of the precipitated silicic acid type, having surface areas of 50 to 1,000 m²/g, or of the precipitated titanium dioxide type, having surface areas of 50 to 400 m²/g.

The reinforcing fillers can be surface-modified according to the prior art, by treatment with organofunctional silanes, siloxanes or silazanes.

(3) Non-reinforcing fillers, for example ground or naturally fine-particled quartz, precipitated or naturally occuring chalk, aluminum oxide, hydrated aluminum oxide, mica powder, talc, ground dolomite, naturally occurring or synthetic aluminum silicates, metal powders and metal oxides in powder form, glass powders, boron carbide and pigments, so long as these do not prevent crosslinking by an addition reaction.

(4) Additives, such as heat stabilizers, flame-retarding agents, reversion stabilizers, plasticizing additives and agents for improving the calendering properties.

(5) Crosslinking agents selected from the class of silicon hydride compounds of the general formula:

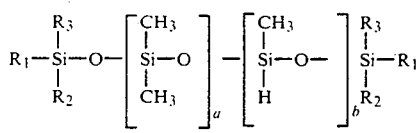

wherein $R_1$ can denote methyl, phenyl, vinyl or hydrogen, $R_2$ can be selected from the group comprising methyl, phenyl and saturated aliphatic hydrocarbon radicals with 2 to 20 carbon atoms, $R_3$ can denote methyl, phenyl, polyoxyalkylene, alkyl with 2 to 20 carbon atoms or a polymeric side chain generated from vinyl monomers which can be formed by free radical grafting reactions according to European Patent Application Nos. 31,887, 29,948 and 29,947, a denotes a number between 0 and 2,000, preferably a number between 0 and 500, and b denotes a number between 0 and 2,000, preferably a number between 1 and 50 with the proviso that the compound contains at least two SiH-bonds.

(6) An addition catalyst in an amount of at least 0.1 part by weight of platinum per million parts by weight of the total weight of constituents (1), (2) and (5).

The platinum compound used can be any known such compound of this type, such as platinum itself, platinum deposited on a support, such as silica gel or powdered charcoal, platinum chloride, salts of platinum or chloroplatinic acid.

A preferred form of platinum is a tetravinyltetramethylcyclotetrasiloxane complex. Another preferred form of platinum is chloroplatinic acid, and in particular either in its commercially available hexahydrate form or in the anhydrous form, both of them dissolved in alcohol, since these compounds can easily be dispersed in organosilicon systems and do not affect the color of the mixture. Examples of other platinum compounds are $PtCl_2[(CH_2Ch_2CH_2CH_3)_3]_2$, platinum bromide, complexes of a platinum halide and an olefine, such as ethylene, propylene, butylene, cyclohexene or styrene, Pt $(CH_3CN)_2Cl_2$, [Pt $(CH_3CN)_2(CH_3)_4]Cl_2$, Pt $(NH_3)_2Cl_2$, $K[PtCl_3CH_2CH_2OH]$, $K[PtBr_3(C_2H_4)]$, $H_2Pt(CN)_4.5H_2$, $H[PtCl_3(CH_3CN)]$, Pt $(NH_3)_2$ $(CNS)_2$, $PtCl_2.PCl_3$, $[Pt(NH_3)_4].[PtC_4]$, $PtCl_2$ P $(CH_2CH_3)_3$, $PtCl_2.P$ $(OH)_3$, $PtCl_2.P$ $(OCH_2CH_3)_3$, $PtCl_2.[P(OCH_2CH_3)_3]_2$, $Pt(OOCH_2SCH_2CH_3)_2$, $Pt(CN)_3$, $(CH_3)_4Pt$, $(CH_3)_3Pt-Pt(CH_3)_3$,

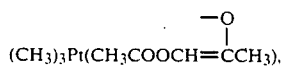

$PtCl_2CO$ and $PtBr_2Co$.

At least 0.1 part by weight of platinum should be present per million parts by weight of the total weight of 1, 2 and 5. However, since this small amount of catalyst can easily be poisoned by impurities present in the system, 1 to 20 ppm of platinum are preferably employed. It is also possible to use a larger amount of platinum. However, economic considerations rather favor the use of the smaller catalyst amount mentioned.

The ratio weight by weight of complex forming inhibitor to platinum is less than 100, preferably 10 to 50. Extremely satisfying results are obtained with triallylcyanurate which is non toxic, storage stable, readily available at low cost and does not discolor or otherwise deteriorate the properties of the vulcanized silicone rubber. The very same results are obtained with triallylisocyanurate but at much higher costs. Other allylesters like triallylcitrate have proved useful as well and may be considered to be used in many practical applications, especially for the two-component liquid silicone rubber technology were limited storage stability of only a few days is sufficient. The effects observed yet are not limited to allyl-compounds, but other molecular structures which may serve as a complex ligand for platinum and related metals are as useful. Tetramethyltetravinylcyclotetrasiloxane, for example, gives excellent inhibitor-efficiency with all the advantages mentioned with triallylcyanurate but at a very high level of cost. As a representative for the group of complex ligands which do not work on π-electronsystems but on the donor properties of electron pairs we have chosen N,N'bis-(trimethylsilyl)-urea. This compound benefits from its chemical and toxicological neutrality and is easily accessible. Very good efficiency is demonstrated in the examples when combined with small amounts of peroxide, whereas the compound by itself shows only marginal properties as an inhibitor.

(7) An inhibitor system selected from (a) the above-mentioned known compounds. Non-toxic, low-odor inhibitors from the class of olefinically unsaturated compounds and of amides are particularly preferred. It is also possible to use mixtures of two or more of these known inhibitors. The total amount of inhibitors of this type required with the compositions according to this invention is to achieve the same effect. (b) An organic peroxide, such as is customarily used for crosslinking silicone rubber, or mixtures of such peroxides. The total amount of peroxide required is less than necessary for conventional peroxide-vulcanization. The ratio weight by weight of peroxide to platinum is less than 250, preferably 50 to 150.

With respect to their efficiency at room temperature those peroxides are beneficial whose decomposition rate is high enough at lower temperatures but not as high as to be consumed up within the intended storage time of the silicone-rubber mixture. For improved storage stability of high-viscosity silicone rubber mixtures or increased pot-life of liquid silicone rubber mixtures the use of substituted Di-benzoylperoxides has proved extremely favorable. Besides Bis-(2,4-dichlorobenzoyl)-peroxide which is explicitely mentioned in the examples, as it is the one of the family which is easiest available in the market, we have found good results also with Bis-(ortho-chlorobenzoyl)peroxide and a somewhat reduced efficiency with Bis-(para-chlorobenzoyl)peroxide. Those peroxides possessing higher thermal stability, as, for example, Tertiarybutylperbenzoate or Dicumylperoxide are producing only minor or no effects at room temperature but rather do influence the vulcameter-curves at higher temperatures in a sense as to prevent premature scorch of the compound. Besides they accelerate final vulcanization.

(8) Processing auxiliaries, such as, for example, polysiloxanes which contain α-ω-hydroxyl-end groups and which may consist of dimethylsiloxy-units only, or may contain additional vinylmethyl groups, phenyl groups or phenyl and vinyl groups. Other processing auxiliaries which have proved being useful for the invention are diarylsilanediols, polysilazanes, hexamethyldisilazane or 1,3-divinyl-1,1,3,3-tetramethyldisilazane.

These mixtures can be prepared on the mixing units commercially available for pasty substances. These include high-speed stirrers, for example dissolvers, triple roll mixing units, screw mixers, planetary mixers, two-roll mills, and paddle-type kneaders with or without a ram. The individual components can be added in any desired sequence, which is at the discretion of the expert.

The compositions according to the invention are outstandingly suitable, for example, for the production of industrial rubber moldings by the processing methods customary in the rubber industry, such as, for example, injection molding, transfer molding and compression molding, and furthermore for continuous vulcanization under atmospheric pressure by means of IR radiation or hot air or for vulcanization under pressure in steam or nitrogen gas as the heat transfer medium.

The mixing devices described are preferably equipped with connections for an inert gas and vacuum and provided with heating and cooling devices in order to enable the mixing operation to proceed at the desired temperature. The invention is described in more detail by the examples which follow, without being restricted in scope. (The "%" and "parts" data denote "% by weight" or "parts by weight", unless otherwise indicated).

EXAMPLE 1

A silicone rubber premix is prepared on a rubber-mixing unit by mixing 40 parts of a pyrogenically produced silicic acid with a surface area of 200 m$^2$/g, 2 parts of pyrogenic titanium dioxide with a surface area of 50 m$^2$/g, 5.4 parts of a processing auxiliary of the type of polydimethylsiloxanes containing vinyl groups and hydroxyl end groups and with a vinyl content of 5%, calculated as the vinylmethylsiloxy unit, and 0.5 parts of hexamethyldisilizane with one another into 100 parts of a polydimethylsiloxane containing vinyl groups, with 0.175% of vinyl groups, calculated as vinylmethylsiloxy units, in the customary manner. 10 ppm of platinum are added in the form of a silicone-soluble tetravinyl-tetramethylcyclotetrasiloxane-platinum complex. The premix thus obtained is used as the base mixture for Examples 2 to 12.

EXAMPLE 2

1.5 parts of a polydimethylsiloxane containing Si-H groups and with 33% of methyl-hydrogen-siloxy units and a viscosity of 20 mPas are mixed with 143 parts of the base mixture according to Example 1 with the aid of a two-roll mill at a controlled temperature of 20° C. The mixture is divided into 3 parts. One part is stored at room temperature and its replasticizing properties are tested on the two-roll mill after 24 hours. It is found that the mixture has crosslinked to such an extent that milling until soft is no longer possible, but rather the rubber hide is ground to powder as a result of the shearing force of the mixing unit.

The second part of the mixture is introduced into the sample chamber of a vulcameter and is warmed up to 200° C. at a heating up rate of 5° C. per minute. The vulcameter indicates the progress of the crosslinking reaction in the form of a shear modulus curve.

The third part of the mixture is first vulcanized to sheets in accordance with the DIN specifications for testing rubber materials, except that, deviating from the DIN specifications, production of the blanks and vulcanization take place immediately after preparation of the mixture. Test pieces are cut out of the sheets, which have been vulcanized and have been after-heated at 200° C. in hot air for 6 hours, and these are used for determining the following test parameters: Shore A hardness, tensile strength, elongation at break and rebound resilience.

EXAMPLE 3

1.5 parts of a polydimethylsiloxane containing Si-H groups and with 33% of methyl-hydrogen-siloxy units and a viscosity of 20 mPas are mixed with 143 parts of the base mixture according to Example 1 with the aid of a two-roll mill at a controlled temperature of 20° C. 0.025 part of triallyl cyanurate are also added to the mixture. The mixture is divided into 3 parts. One part is stored at room temperature and the replasticizing properties are tested on the two-roll mill in each case after 24 hours, 3 days and 7 days. The replasticizing properties are significantly poorer after one day than is usual with commercially available silicone rubber mixtures which crosslink with peroxide, significant stiffening is to be observed after 3 days, and the mixture has hardened to the extent of being unprocessable after 7 days. The second part of the mixture is subjected to vulcametry according to Example 2.

The third part is crosslinked to give test sheets according to Example 2.

EXAMPLE 4

0.025 part of triallyl cyanurate and 0.25 part of bis-(2,4-dichlorobenzoyl)peroxide as a 50% strength paste in silicone oil are added to the base mixture, which has already been described in Example 2, of 143 parts of premix and 1.5 parts of Si—H oil. The mixture is divided into three parts.

One part is stored at room temperature for up to 3 weeks, during which time the replasticizing properties on the two-roll mill remain excellent.

The second and third parts are subjected to the procedures described in the preceding examples.

EXAMPLE 5

0.25 part of bis-(2,4-dichlorobenzyl)peroxide as a 50% strength paste in silicone oil are added to the base mixture, which has already been described in Example 2, of 143 parts of premix and 1.5 parts of Si—H oil, and the mixture is divided into three parts. One part is stored at room temperature for 24 hours. After this time, the mixture had hardened to the extent of being unprocessable.

The second part of the mixture is subjected to vulcametry according to Example 2.

The third part is crosslinked to give test sheets according to Example 2.

EXAMPLE 6

A premix is prepared on a rubber-mixing unit analogously to Example 1, but with omission of the 10 ppm of platinum in the form of the tetravinyl-tetramethylcyclotetrasiloxane-platinum complex. 1.5 parts of the Si—H oil which has already been described and 0.25 part of bis-(2,4-dichlorobenzoyl)peroxide as a 50% strength paste in silicone oil are admixed to 143 parts of this base mixture on a two-roll mill at 20° C.

The resulting mixture is divided into 3 parts, and one part is stored at room temperature for up to 3 weeks. After this period, the viscosity of the mixture was unchanged in relation to the initial viscosity.

The second part of the mixture was subjected to vulcametry according to Example 2. In the attempt to produce test sheets, the third part of the mixture crosslinks so incompletely that it cannot be called an elastomer.

EXAMPLE 7

0.1 part of triallyl citrate is admixed to the base mixture, which has already been described in Example 2, of 143 parts of premix and 1.5 parts of Si—H oil.

The mixture is divided into 3 parts. One part is stored at room temperature. The mixture has already hardened to the extent of being unprocessable after a storage period of 24 hours.

The second part of the mixture is subjected to vulcametry according to Example 2.

The third part is crosslinked to give test sheets according to Example 2.

EXAMPLE 8

0.1 part of triallyl citrate and 0.25 part of bis(2,4-dichlorobenzoyl)peroxide as a 50% strength paste in silicone oil are admixed to the base mixture, which has already been described in Example 2, of 143 parts of premix and 1.5 parts of Si—H oil. The mixture is divided into 3 parts. One part is stored at room temperature, and the replasticizing properties are tested on the two-roll mill in each case after 24 hours, 3 days and 7 days. After a storage time of 24 hours, the mixture had stiffened only slightly, and after 3 days is had stiffened significantly. The limit of processability is reached after a storage time of 7 days.

The second part of the mixture is subjected to vulcametry according to Example 2.

The third part is crosslinked to give test sheets according to Example 2.

EXAMPLE 9

1.5 parts of the Si—H oil described, 1.0 part of N,N'-bis-(trimethylsilyl)-urea and 0.25 part of bis-(2,4-dichlorobenzoyl)peroxide as a 50% strength paste in silicone oil are added to 143 parts of the base mixture of Example 1. The mixture is divided into three parts. One part is stored at room temperature for up to 3 weeks, during which the replasticizing properties remain excellent.

The second part of the mixture is subjected to vulcametry according to Example 2.

The third part is crosslinked to give test sheets according to Example 2.

EXAMPLE 10

1.5 parts of the Si—H oil with 33% of methyl-hydrogen-siloxy groups and 0.5 part of bis-(2,4-dichlorobenzoyl)peroxide as a 50% strength paste in silicone oil are admixed to 143 parts of the base mixture according to Example 1. After storage at room temperature for 21 days, the mixture is still excellently replasticizable.

EXAMPLE 11

A silicone rubber premix is prepared on a rubbermixing unit by mixing 39 parts of a pyrogenically produced silicic acid with a surface area of 200 m$^2$/g, 5.4 parts of a processing auxiliary of the type of polydimethylsiloxanes containing vinyl groups and hydroxyl end groups and with a vinyl content of 5%, calculated as the vinylmethylsiloxy unit, and 0.5 part of hexamethyldisilazane with one another into 100 parts of a polydimethylsiloxane which contains vinyl groups and has 0.175 % of vinyl groups, calculated as vinylmethylsiloxy units and 10 ppm of platinum in the form of the complex used in example 1, in the customary manner. 0.1 part of N,N'-bis-(trimethylsilyl)-urea and 0.25 part of bis-(2,4-dichlorobenzoyl)peroxide as a 50% strength paste in silicone oil are mixed with this base mixture at room temperature. The mixture is divided into 3 parts. One part is stored at room temperature for up to 3 weeks, during which the replasticizing properties remain good. The second part of the mixture is subjected to vulcametry according to Example 2. The third part is crosslinked to give test sheets according to Example 2.

EXAMPLE 12

Only 0.5 part of bis-(2,4-dichlorobenzoyl)peroxide as a 50% strength paste in silicone oil is added to the base mixture according to Example 11 at room temperature.

The mixture can still be replasticized well after storage at room temperature for 7 days, and has approached the limit of processability after 21 days.

The properties which are essential to the invention in Examples 2 to 12 are summarized in Table 1. Crosslinking of Example 6 is only inadequate, and no usable elastomer results. Examples 2, 5 and 7 already crosslink at room temperature in such a short time that they cannot be termed safe to handle.

The replasticizing time is measured in minutes on a laboratory roll mill with a roll diameter of 75 mm and a cheek separation of 120 mm, at a temperature of 23° C. and at 20 rpm. The amount introduced was in each case 70 g. The properties of the crosslinked elastomers (vulcanized products) were determined in accordance with DIN 53,505 (H), DIN 53,504 (F, D) and ISO 4,662 (E). The vulcameter investigations were carried out in accordance with the method of DIN 53,529, but maintaining a temperature program, which was linear with respect to time, of 5°/minute from 50 to 200° C. $T_{10}$ denotes the temperature at which crosslinking had reached 10% of the end value. The smaller $T_{10}$ is, the larger in general is the danger of premature incipient crosslinking during storage and processing of the mixture.

TABLE 1

| Example No. | Vulcameter $T_{10}$ °C. | Replasticizing times, minutes after storage at room temperature | | | Properties of the vulcanized product | | | |
|---|---|---|---|---|---|---|---|---|
| | | 3 days | 7 days | 21 days | H | F | D | E |
| 2 | 58 | 7 | — | — | 56 | 8.2 | 400 | 41 |
| 3 | 125 | 1 | 3 | 7 | 54 | 7.3 | 385 | 38 |
| 4 | 120 | 0.1 | 0.2 | 0.3 | 54 | 9 | 455 | 36 |
| 5 | 95 | 7 | — | — | 50 | 6 | 325 | 35 |
| 6 | 115 | 0.1 | 0.1 | 0.1 | 25 | 2.3 | 1.100 | 15 |
| 7 | 80 | 7 | — | — | 41 | 6.3 | 525 | 27 |
| 8 | 90 | 3 | 7 | — | 47 | 6 | 420 | 27 |
| 9 | 115 | 0.2 | 0.2 | 0.3 | 40 | 7.3 | 475 | 28 |
| 10 | 110 | 0.5 | 0.5 | 1 | 51 | 7.6 | 415 | 43 |
| 11 | 115 | 0.6 | 0.75 | 1.5 | 46 | 7.6 | 485 | 33 |

TABLE 1-continued

| Example No. | Vulcameter $T_{10}$ °C. | Replasticizing times, minutes after storage at room temperature | | | Properties of the vulcanized product | | | |
|---|---|---|---|---|---|---|---|---|
| | | 3 days | 7 days | 21 days | H | F | D | E |
| 12 | 110 | 0.75 | 1 | 2 | 50 | 8.1 | 430 | 39 |

Explanation of the abbreviations:
H = Shore A hardness
F = Tensile strength MPa
D = Elongation at break %
E = Rebound resilience %

EXAMPLE 13

The following components are mixed with one another at room temperature in a mixing vessel which is provided with a high-speed stirrer and can be evacuated:

100 parts by weight of a polydimethylsiloxane which contains dimethylvinylsiloxy end groups and has an average chain length of 800 dimethylsiloxy units, 7 parts by weight of a hydrogen-containing silicone oil consisting of 33% of methyl-hydrogen-siloxy units and 67% of dimethylsiloxy units, and 10 ppm of platinum in the form of a silicone-soluble complex compound with tetravinyltetramethylcyclotetrasiloxane.

After the components have been brought together, the viscosity of the mixture rises within a short time, and the composition has crosslinked to an elastic rubber in less than 5 hours.

In the examples which follow, bis-(2,4-dichlorobenzoyl) peroxide in the form of a 15% strength dispersion is added in a mixture of 1 part of polyidmethylsiloxane which contains trimethylsilyl end groups and has a viscosity of 1,000 mPas and 2 parts of a polydimethylsiloxane which contains dimethylvinyl end groups and has a viscosity of 10,000 mPas.

EXAMPLE 14

0.05 part of bis-(2,4-dichlorobenzoyl) peroxide in the form of the mixture described above is added to 107 parts of a mixture of silicone polymer, Si—H oil and platinum according to Example 13.

After the components have been brought together, the viscosity of the mixture rises within a short time, and after 5 hours the mixture gels.

EXAMPLE 15

0.1 part of triallyl cyanurate is added to 107 parts of a mixture of silicone polymer, Si—H oil and platinum according to Example 13.

After the components have been brought together, the viscosity of the mixture gradually rises, until gelling occurs after 24 hours.

EXAMPLE 16

0.05 part of bis(2,4-dichlorobenzoyl) peroxide in the form of the mixture described and 0.1 part of triallyl cyanurate are added to 107 parts of a mixture of silicone polymer, Si-H oil and platinum according to Example 13.

After the components have been brought together, the viscosity rises substantially more slowly than in Examples 14 and 15. The time of gelling is delayed to 48 hours.

EXAMPLE 17

0.25 part of bis-(2,4-dichlorobenzoyl) peroxide in the form of the mixture described and 0.1 part of triallyl cyanurate are added to 107 parts of a mixture of silicone polymer, Si—H oil and platinum according to Example 13.

After the components have been brought together, the viscosity of the mixture is measured after one day and after one, two, three and four weeks. The viscosity of the mixture rises linearly, and after 4 weeks reaches 1.6 times the value of the initial viscosity. The mixture is also still easily processable after this period.

EXAMPLE 18

0.25 part of bis(2,4-dichlorobenzoyl) peroxide in the form of the mixture described and 0.1 part of triallyl cyanurate are added to 107 parts of a mixture of silicone polymer, Si—H oil and 5 ppm of platinum according to Example 13.

After the components have been brought together, the viscosity of the mixture is measured after one day and after one, two, three and four weeks.

The viscosity of the mixture rises linearly, and after 4 weeks reaches 1.4 times the value of the initial viscosity.

The mixture is also readily processable after this period.

EXAMPLE 19

0.25 part of bis-(2,4-dichlorobenzoyl) peroxide in the form of the mixture described and 0.1 part of triallyl cyanurate are added to 107 parts of a mixture of silicone polymer, Si—H oil and platinum according to Example 13.

After the components have been brought together, the viscosity of the mixture increases slowly. The mixture is still processable after 7 days and gelling occurs after 14 days.

It will be appreciated that the instant specification and examples are set forth by way of illustration and not limitation, and that various modifications and changes may be made without departing from the spirit and scope of the present invention.

What is claimed is:

1. In a polysiloxane rubber composition which vulcanizes under heat to form an elastomer, comprising
   (a) a polyorganosiloxane containing unsaturated radicals,
   (b) a compound containing Si-H groups,
   (c) a platinum-containing addition catalyst, and
   (d) an organic peroxide, the improvement which comprises
   (e) a compound capable of forming a complex ligand with platinum and selected from the group consisting of triallyl cyanurate, triallyl citrate and bis-trimethylsilyl-urea, whereby the storability of the composition is improved.

2. A composition according to claim 1, wherein the organic peroxide (d) is dichlorobenzoyl peroxide.

3. A composition according to claim 1, wherein the ligand-former (e) is triallyl cyanurate.

4. A composition according to claim 1, wherein the ligand-former (e) is bis-trimethylsilyl-urea.

5. A composition according to claim 1, wherein the catalyst (c) is soluble in the polyorganosiloxane (a).

6. A composition according to claim 2, wherein the ligand-former (e) is triallyl cyanurate or bis-trimethylsilyl-urea and the catalyst (c) is soluble in the polyorganosiloxane (a).

7. A process for producing a composition according to claim 1, comprising pre-mixing (a), (b) and (c), mixing (d) with (e), and then combining the two mixtures.

* * * * *